United States Patent
Booij et al.

(10) Patent No.: US 10,114,105 B2
(45) Date of Patent: Oct. 30, 2018

(54) LOCATION SYSTEM USING ULTRASOUND

(71) Applicant: Sonitor Technologies AS, Oslo (NO)

(72) Inventors: Wilfred Edwin Booij, Nordby (NO);
Oystein Haug Olsen, Asker (NO)

(73) Assignee: Sonitor Technologies AS, Oslo (NO)

( * ) Notice: Subject to any disclaimer, the term of this patent is extended or adjusted under 35 U.S.C. 154(b) by 209 days.

(21) Appl. No.: 14/419,207

(22) PCT Filed: Aug. 1, 2013

(86) PCT No.: PCT/GB2013/052062
§ 371 (c)(1),
(2) Date: Feb. 2, 2015

(87) PCT Pub. No.: WO2014/020348
PCT Pub. Date: Feb. 6, 2014

(65) Prior Publication Data
US 2015/0160330 A1    Jun. 11, 2015

(30) Foreign Application Priority Data
Aug. 3, 2012   (GB) .................................. 1213846.7

(51) Int. Cl.
*G01S 5/18*     (2006.01)
*G01S 1/74*     (2006.01)

(52) U.S. Cl.
CPC . *G01S 5/18* (2013.01); *G01S 1/74* (2013.01)

(58) Field of Classification Search
CPC ...................................... G01S 1/74; G01S 5/18
See application file for complete search history.

(56) References Cited

U.S. PATENT DOCUMENTS

| 3,924,065 | A |   | 12/1975 | Freeny |                        |
|-----------|---|---|---------|--------|------------------------|
| 4,001,772 | A | * | 1/1977  | Powell | G08B 26/007            |
|           |   |   |         |        | 327/301                |
| 4,763,103 | A | * | 8/1988  | Galula | H02J 13/0031           |
|           |   |   |         |        | 340/12.33              |

(Continued)

FOREIGN PATENT DOCUMENTS

| EP | 0441031 A2 | 8/1991  |
|----|------------|---------|
| WO | 2008152170 | 12/2008 |

OTHER PUBLICATIONS

EP office action for EP13750366.0 dated Sep. 8, 2017.

*Primary Examiner* — Ian J Lobo
(74) *Attorney, Agent, or Firm* — O'Shea Getz P.C.

(57) ABSTRACT

A transmitter device transmits an ultrasonic signal encoding a binary identifier. Each bit position in the identifier is associated with a pair of frequencies and with first and second time positions in the signal. The bit value determines which of the pair of frequencies is transmitted at the first time position, with the other being transmitted at the second time position. A receiver device receives the signal. Each bit position of the identifier is decoded based on the strength of the received signal at (a) the first frequency and first time position associated with the particular bit position, (b) the associated first frequency and second time position, (c) the associated second frequency and first time position, and (d) the associated second frequency and second time position. The decoded identifier is used to determine information relating to the position of a mobile one of the devices.

28 Claims, 3 Drawing Sheets

(56) References Cited

U.S. PATENT DOCUMENTS 5,257,288 A * 10/1993 Moser ................... H04L 25/497
 341/53
7,864,633 B2 1/2011 Holm et al.
7,966,008 B2 6/2011 Graves et al.

* cited by examiner

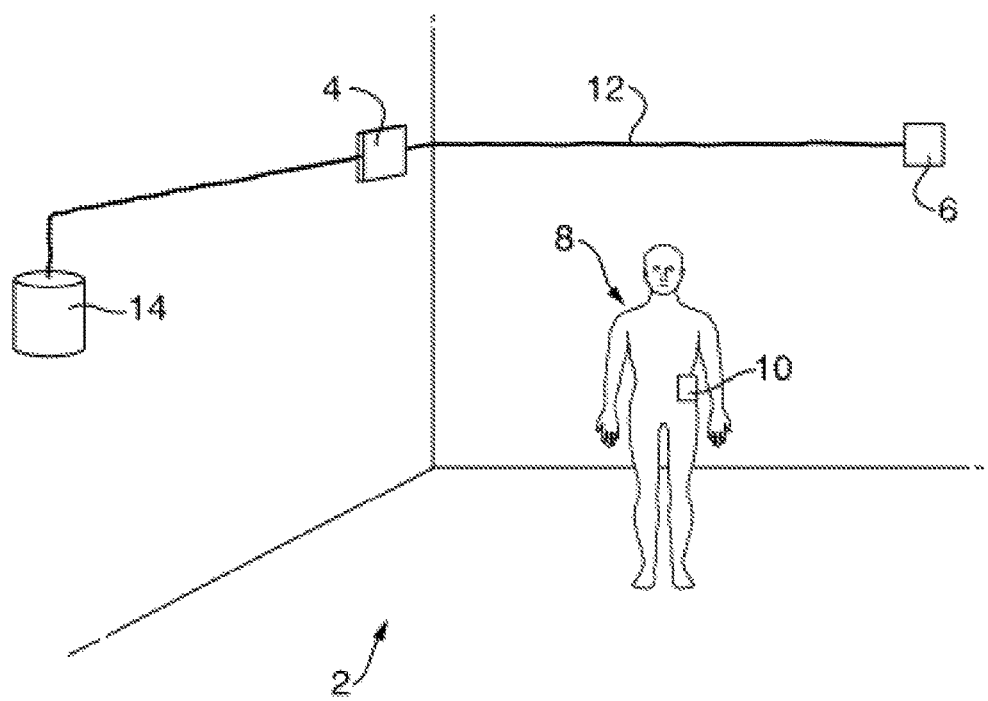
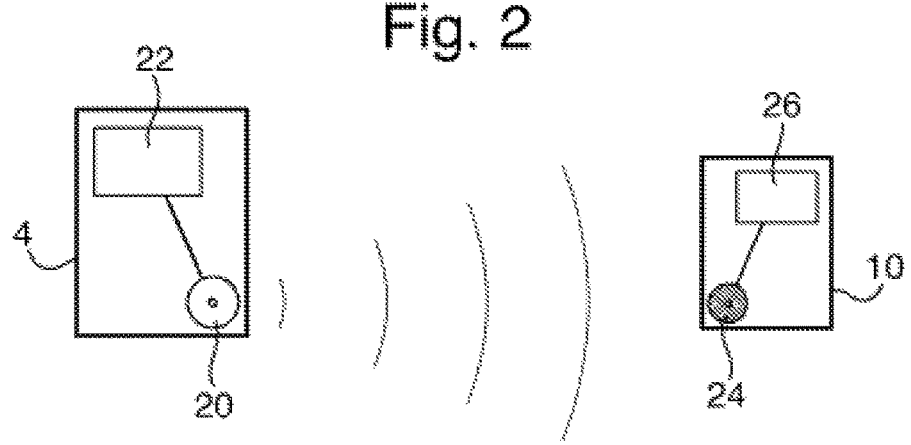

| Time (ms) | Freq. Pair | Content |
| --- | --- | --- |
| 0 | A | trigger tone |
| 10 | B | synch tone |
| 20 | C | Continuation bit (OOK) |
| 30 | D | ZID1-pos |
| 40 | E | ZID2-pos |
| 50 | A | ZID3-pos |
| 60 | B | ZID4-pos |
| 70 | C | ZID5-pos |
| 80 | D | ZID1-neg |
| 90 | E | ZID2-neg |
| 100 | A | ZID3-neg |
| 110 | B | ZID4-neg |
| 120 | C | ZID5-neg |
| 130 | D | AID1-pos |
| 140 | E | AID2-pos |
| 150 | A | AID3-pos |
| 160 | B | AID4-pos |
| 170 | C | AID5-pos |
| 180 | D | AID1-neg |
| 190 | E | AID2-neg |
| 200 | A | AID3-neg |
| 210 | B | AID4-neg |
| 220 | C | AID5-neg |
| 230 | D | CON1-pos |
| 240 | E | CON2-pos |
| 250 | A | CON3-pos |
| 260 | B | CON4-pos |
| 270 | C | CON5-pos |
| 280 | D | CON1-neg |
| 290 | E | CON2-neg |
| 300 | A | CON3-neg |
| 310 | B | CON4-neg |
| 320 | C | CON5-neg |

Fig. 3

LOCATION SYSTEM USING ULTRASOUND

This application is entitled to the benefit of, and incorporates by reference essential subject matter disclosed in PCT Application No. PCT/GB2013/052062 filed on Aug. 1, 2013, which claims priority to GB1213846.7 filed Aug. 3, 2012.

BACKGROUND OF THE INVENTION

1. Technical Field

This invention relates to systems and methods for determining the position of a mobile unit using ultrasound.

2. Background Information

There are many situations in which it is desirable to be able to determine the location of a moveable object, such as a person or an item of equipment, within an area, such as a hospital ward.

It is known to provide a network of static base stations, e.g. attached to ceilings or walls, and to attach tags or similar devices to moveable objects, where the tags communicate with one or more of the base stations through ultrasound signals so as to allow the location of the tagged object to be determined. For example, such a system may be used to determine what room the object is in. Ultrasound is well suited to this purpose as it is undetectable by humans. It also travels much more slowly through air than radio waves do, and attenuates more rapidly, especially in the presence of structural building members such as walls, ceilings and floors. This can facilitate proximity detection using time of flight information or received signal strength.

U.S. Pat. No. 7,864,633 describes a system for determining the position of a mobile acoustic transmitter unit. The transmitter unit, which can be attached to an object to be monitored, transmits a frequency-shift key (FSK) encoded acoustic signal. A detector unit may be installed in a room of a building. The transmitter unit's position can be determined by comparing the received signal strength of the signal at two such detector units to determine which of the detector units is closer to the transmitter unit. In noisy environments, chirp FSK may be used instead of conventional FSK.

Such an approach has certain limitations, however. In particular, as the number of mobile transmitter units in the system increases, the average rate of position updates for each transmitter unit (i.e. the number of position estimates per minute) will typically decrease because each unit has to wait longer for silence before it can start to transmit. Moreover, interference between units is still possible, for instance if two units start transmitting substantially simultaneously. To cope with noise, digital signal processing (DSP) circuits are used for processing received chirp FSK signals; such circuits are typically expensive and power-hungry.

The present invention seeks to provide an alternative approach.

SUMMARY OF THE DISCLOSURE

From a first aspect, the invention provides a system for determining the position of a mobile device, the system comprising: a transmitter device arranged to transmit an ultrasonic signal that encodes a binary identifier, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal; a receiver device arranged to receive the ultrasonic signal, wherein one of the transmitter device and the receiver device is a mobile device; decoding means configured to decode the binary identifier from the received signal by determining a value for each bit position in the identifier using information relating to the strength of the received signal at (a) the first frequency and first time position in the received signal that are associated with the bit position, (b) the associated first frequency and second time position, (c) the associated second frequency and first time position, and (d) the associated second frequency and second time position; and processing means configured to use the decoded binary identifier to determine information relating to the position of the mobile device.

From another aspect, the invention provides a method of determining the position of a mobile device using an ultrasonic signal, the method comprising: transmitting an ultrasonic signal that encodes a binary identifier from a transmitter device, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal; receiving the ultrasonic signal at a receiver device, wherein one of the transmitter device and the receiver device is a mobile device; and decoding the binary identifier from the received signal by determining a value for each bit position in the identifier using information relating to the strength of the received signal at (a) the first frequency and first time position in the received signal that are associated with the bit position, (b) the associated first frequency and second time position, (c) the associated second frequency and first time position, and (d) the associated second frequency and second time position; and using the decoded binary identifier to determine information relating to the position of the mobile device.

From a further aspect, the invention provides a transmitter device arranged to transmit an ultrasonic signal that encodes a binary identifier, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal.

From a still further aspect, the invention provides a receiver device arranged to: receive an ultrasonic signal that encodes a binary identifier, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal; and decode the binary identifier from the received signal by determining a value for each bit position in the identifier using information relating to the strength of the received signal at (a) the first frequency and first time position in the received signal that are associated with the bit position, (b) the associated first frequency and second time position, (c) the associated second frequency and first time position, and (d) the associated second frequency and second time position.

Thus it will be seen by those skilled in the art that, in accordance with the invention, the transmitter device transmits the binary identifier twice in the ultrasonic signal, transmitting each bit of the identifier at two different transmission times and on two different frequencies. If one of the pair of frequencies associated with a particular bit position is interfered with by any frequency-specific interference, it may nevertheless be possible for the correct value to be decoded by the receiver device, because the value is conveyed separately (redundantly) on the other of the two frequencies, which may not experience the same interference. The damaging effect of short-lived, broad-spectrum interference may also be diminished, because the bit value is transmitted separately at two different times, so if short-lived interference interferes with the signal at one of the time positions, the bit may potentially still be decoded correctly from the signal at the other time position.

This redundancy in frequency and in time has been found to provide a particularly robust system that facilitates reliable decoding of a binary identifier by the receiver device, even in the presence of significant interference from other ultrasound transmitters, or from destructive interference by the signal itself caused by reflective surfaces in the environment. The system can also provide robustness in the case that a microphone in the receiver device has a non-uniform frequency response.

In preferred embodiments, the transmitter device is a static transmitter station, and the mobile device is a mobile receiver unit. The applicant has realised that, in many contexts, such as hospitals, the number of movable objects (people, equipment, etc.) in an area may often be greater than the number of static stations required to provide coverage of the same area. By transmitting from one or more static stations, rather than from mobile units, the number of mobile units can increase indefinitely without requiring more complex transmission signals and without affecting the accuracy of the system.

The binary identifier may be associated with the transmitter device (although not necessarily uniquely). The transmitter device preferably transmits at intervals (e.g. periodically) ultrasonic signals that each encodes the binary identifier. This allows the system to determine a succession of location estimates for the mobile unit at intervals. The signal may comprise other components, such as a signal portion that encodes additional information, and these other components may change from one signal to the next.

The pairs of frequencies associated with each bit position in the binary identifier may be the same for some or all of the bit positions (i.e. binary frequency-shift-keying), but preferably each frequency pair is unique to a particular bit position within the identifier. Moreover, each individual frequency from across all the frequencies pairs is preferably unique to a particular bit position. In this way, no frequency need be transmitted more than once within the encoding of a binary identifier. This reduces the chance of echoes from the transmitter's signal, or the signal of another transmitter or its echoes, interfering with the received signal by increasing the interval between frequency reuse.

The encoding is preferably such that adjacent frequencies from an ordered set containing all of the said frequencies are never transmitted at adjacent time positions in the signal. This can assist accurate decoding by lessening the chance of echoes from a frequency transmitted at one time position from interfering with the reception of a similar frequency at the next one of the time positions in the signal.

The two frequencies of each pair are preferably separated by at least around 3 kHz, so as to allow the receiver unit to distinguish between them accurately.

The transmitter device preferably transmits a frequency at one of the time positions by transmitting that frequency (i.e. causing an ultrasonic transducer in the transmitter station to vibrate at that frequency) over a time window containing the time position; e.g. centred on the time position. Every time position used in the encoding of the binary identifier may have an associated time window defining the duration for which a frequency is transmitted; these window may all be of substantially the same length; e.g. around 10 milliseconds long. The associated time windows may be arranged end to end in the signal, without any substantial intervening gaps, thereby providing an encoding that is compact in time.

The first and second time positions in each pair are preferably separated by more than the length of respective time windows associated with each position, such that the transmissions of the two frequencies for each bit position do not overlap in time. The separation is preferably of a minimum length, such as at least around 10 milliseconds, e.g. around 40 milliseconds, so that energy transmitted in the first time window can decay in the environment before the start of the transmission in the second time window. In this way the possibility of interference at the second time position by echoes from the first time position can be reduced or removed.

In a preferred set of embodiments, the encoding is such that all the first time positions precede all the second time positions in the transmitted signal. This can be seen as equivalent, for at least some embodiments, to transmitting the entire binary identifier using a different binary-frequency-shift-keying (BFSK) encoding for each bit of the identifier, and then subsequently transmitting the bit-wise complement (ones' complement) of the identifier using the same respective BFSK encodings for each bit.

Each pair of time positions is preferably unique to a particular bit position within the binary identifier. Moreover, each individual time position from across all the time-position pairs is preferably unique to a particular bit position. In this way, the transmitter device need only transmit one frequency at a time when transmitting the binary identifier, thereby simplifying the design of the transmitter device.

The transmitter device may comprise an encoder or encoding means and an ultrasound transmission means or unit, wherein the encoder or encoding means is arranged to receive a binary identifier as input and to control the ultrasound transmission means or unit to transmit an ultrasonic signal encoding the binary identifier according to the aforesaid encoding. Alternatively, the encoding may be performed outside the transmitter device, and the transmitter device may store or receive a control signal for controlling an ultrasound transmission means or unit to transmit an ultrasonic signal encoding a binary identifier according to the aforesaid encoding.

In embodiments in which the transmitter device is a static transmitter station and the receiver device is a mobile receiver unit, receipt of the binary identifier by the receiver unit may be used to determine proximity between the transmitter station and the receiver unit. This may, in turn, be used to estimate the position of the mobile receiver unit, using a knowledge of the position of the static transmitter station. For instance, it may be determined that the receiver unit is in the same room as the static transmitter station, if the structure of the building is such that the ultrasound signal would be significantly attenuated outside the room.

The applicant has determined that this encoding methodology is particularly well suited to systems that comprise a plurality of such static transmitter stations, arranged to transmit ultrasonic signals encoding respective binary identifiers (which may or may not be unique to each transmitter station) substantially simultaneously, with all the transmitter stations using the same encoding scheme. The transmitter stations preferably transmit their respective signals with the same transmission power as each other. The idea of deliberately transmitting different identifiers from different transmitter stations, which may be in audible range of each other, simultaneously is counterintuitive; however, the applicant has come to realise that a naïve approach of time-division multiplexing between the transmitter stations, so as to avoid overlapping transmissions, unhelpfully restricts the number of transmitter stations and/or the positioning update rate of the system. The applicant has also recognised that energy consumption in a mobile unit embodying the present invention can be lower than when using a time-division multiplexing approach, because there is no need to decode signals from a number of transmitter stations at different times; rather, signals from a number of transmitters can be processed simultaneously.

By determining the received signal strengths associated with the encoding of each bit position of the identifier, the decoding means can typically determine the binary identifier of the transmitter station to which the mobile receiver unit is closest, even in the presence of signals from other transmitter stations that encode different identifiers (assuming no obstacle impedes a direct line of hearing between the transmitter station and the receiver unit). This can be used for determining an approximate position of the mobile receiver unit in a building, from a knowledge of the locations of all the transmitter stations.

Preferably, the transmitter stations are synchronised so that they each transmit a portion of the signal that encodes a particular bit position (e.g. the first time position associated with the first bit of their respective identifiers) at substantially the same time as each other. If the identifiers are all the same length (e.g. all five bits long), the transmitter stations are preferably configured, for each bit position in the identifiers, to transmit signal portions encoding the value of the identifiers at that bit position substantially simultaneously.

An attractive feature of embodiments of the present invention is that no changes are required to the receiver unit and the decoding means whether the system has just one transmitter station or many. An additional transmitter station can be added simply by assigning a suitable binary identifier to the station and synchronising it with the existing transmitter stations. Its location and identifier can be registered with the position-determining processing means and it can start being used for determining the position of the mobile receiver unit.

The applicant has found that, by exploiting the received signal strength at both frequencies and both time positions for each bit of the identifier, particularly accurate discrimination between multiple synchronised transmitter stations is possible. In particular, when two transmitter stations transmit binary identifiers that differ by just a single bit, both transmitter stations will transmit both of the frequencies associated with the distinguishing bit position, but at different times from each other. This enables a comparison of the received signal strengths from the two transmitters on both the first frequency and the second frequency. If one of the frequencies is suffering from noise, such as destructive interference, it may nevertheless still be possible to identify a closer one of the transmitter stations because of the information conveyed by the other, non-interfered-with frequency.

The applicant has discovered that such an arrangement allows the effects of destructive interference to be mitigated, since such interference will typically affect one frequency more than another. The system can thus allow for robust position determination of the receiver unit even when it is in an area where there is significant destructive interference at one of the two frequencies used to encode a particular bit position; this commonly occurs when the receiver unit is close to the corner of a room, due to interfering reflections from the walls and floor/ceiling. Destructive interference can be problematic in naive approaches based on received signal strength, since the signal strength after interference may be many times less than that of the original signal, potentially leading to incorrect signal decoding. Constructive interference, by contrast, is typically less problematic as it has a relatively smaller effect on signal strength (e.g. less than doubling the strength).

The signal transmitted by one or more of the transmitter stations preferably comprises a synchronisation preamble. This may be a predetermined tone of predetermined duration. The decoding means may be configured to use the preamble in the received signal to synchronise subsequent processing of the received signal. For instance, the decoding means may use the preamble to determine the first and second time positions associated with a particular bit position, or to determine the start of respective time windows containing these time positions. The decoding means may synchronise the processing of a received signal using the first-received such preamble that exceeds a threshold signal level after a predetermined start time (e.g. once a predetermined time interval has elapsed after processing a preceding received signal).

In this way, the decoding means is likely to synchronise to a signal from the closest (by time of flight) of a plurality of synchronised transmitter stations to the receiver unit, since the signals from the other transmitter stations will typically arrive at the receiver unit later than that of the closest transmitter station, due to the longer distances over which these signals travel. This can increase the likelihood of the decoding means correctly decoding the identifier of the closest transmitter station to the mobile receiver unit.

For instance, when the transmitter stations transmit a particular frequency for a 10 millisecond time window, this corresponds to a distance of 3.4 meters. Thus synchronised transmissions will only overlap in time at a receiver unit when the distances from it to multiple transmitter stations differ by less than 3.4 meters. If the distance from the receiver unit to the second closest transmitter station is more than 3.4 meters greater than the distance from the receiver unit to the closest transmitter station, there will be no overlap at all. The receiver unit preferably samples the received signal over a relatively small receive window for each time position—e.g. of around 3 milliseconds duration—so as to capitalise on this timing-based discrimination. When the difference between transmitter station distances is less than 3.4 meters, discrimination is still possible due to the different signal strengths.

This combination of signal strength discrimination and inherent time-of-flight discrimination has been found to provide a particularly effective location system.

For each bit of the identifier, the decoding means preferably determines an amplitude value for the first frequency and first time position, and an amplitude value for the first frequency and second time position. It preferably also determines an amplitude value for the second frequency and first time position, and an amplitude value for the second frequency and second time position.

These amplitude values may represent the ultrasound energy received by the receiver unit around a particular frequency over a fixed receive window (e.g. of width around 3 milliseconds). The receive window may be offset from a synchronisation preamble by an amount corresponding to a particular time position. Both frequencies may be sampled simultaneously for a given time position, or they may be sampled sequentially (e.g. a first 3 millisecond receive window tuned to the first frequency, followed by a second 3 millisecond receive window tuned to the second frequency). A sequential approach may be appropriate if the receiver unit only has a single analogue tuner. The received energy may be determined for a frequency window, containing the particular frequency, of a width that would accommodate a degree of Doppler shift due to movement of the mobile unit relative to the transmitter station. In some embodiments the frequency window may be sized so as to encompass an amount of Doppler shift associated with movement of up to around 10 meters/second towards and away from the transmitter station.

The decoding means preferably calculates the difference between the amplitude value for the first frequency and first time position $A_n(f1, t1)$ and the amplitude value for the first frequency and second time position $A_n(f1, t2)$, for each bit position, n: $A_n(f1, t1)-A_n(f1, t2)$. If only one transmitter station is in audible range of the mobile receiver unit, it can be expected that the amplitude will be high at one of these time positions and low or zero at the other time position. However, if multiple transmitter stations are in audible range and are transmitting binary identifiers that differ in value at a particular bit position, it can be expected that the difference value will be smaller.

The decoding means may further calculate a difference ratio for the first frequency for a particular bit position, n, by dividing the difference by the sum of the amplitude values for the first and second time positions:

$$R_n(f1)=[A_n(f1,t1)-A_n(f1,t2)]/[A_n(f1,t1)+A_n(f1,t2)].$$

The decoding means may also similarly calculate a difference ratio for the second frequency for the particular bit position, n:

$$R_n(f2)=[A_n(f2,t1)-A_n(f2,t2)]/[A_n(f2,t1)+A_n(f2,t2)].$$

If there is no interference from other transmitter stations or other sources, it may be expected that the difference ratio for the first frequency and the difference ratio for the second frequency would sum together to give zero: $R_n(f1)+R_n(f2)=0$.

In some embodiments, the decoding means may determine the binary value for a bit position, n, in the decoded identifier according to whether or not the difference ratio for the first frequency is greater than the difference ratio for the second frequency.

However, in a more preferred set of embodiments, the decoding means determines the binary value for a bit position, n, in the decoded identifier according to whether or not the amplitude value for the first frequency and first time position plus the amplitude value for the second frequency and second time position is greater than the amplitude value for the second frequency and first time position plus the amplitude value for the first frequency and second time position; i.e. whether $$A_n(f1,t1)+A_n(f2,t2)>A_n(f2,t1)+A_n(f1,t2).$$

In another preferred set of embodiments, the decoding means determines the binary value for a bit position, n, in the decoded identifier according to the sign of a running average of a function of $A_n(f1, t1)$, $A_n(f2, t2)$, $A_n(f2, t1)$, $A_n(f1, t2)$ determined across a plurality of transmission intervals. The function may be: $[A_n(f1, t1)+A_n(f2, t2)-A_n(f2, t1)-A_n(f1, t2)]/[A_n(f1, t1)+A_n(f2, t2)+A_n(f2, t1)+A_n(f1, t2)]$. The bitwise running average may be determined using a low-pass filter, such as an alpha-beta filter.

These latter approaches have been found to give a more reliable decoding.

The decoding means may also determine a reliability measure for each bit of the binary identifier in the received signal. In some preferred embodiments, the reliability measure is a function of the sum of the difference ratio for the first frequency and the difference ratio for the second frequency; for instance, the absolute value of a half of this sum. The reliability measure for a bit may be determined as a running average (e.g. using an alpha-beta filter) across a plurality of transmission intervals. The decoding means or position-determining processing means may use the reliability measures for all the bits in the identifier when using the decoded binary identifier to determine information relating to the position of the mobile receiver unit. It may determine a reliability measure for the decoded identifier by summing the absolute values of the reliability measures for each bit. However other reliability measures may be used.

In some embodiments, a reliability measure for the decoded identifier must have to exceed a reliability threshold value before the decoded identifier value is used to determine a position estimate for the mobile unit. If the threshold is not met, the decoding means or processing means may assume that the position of the mobile receiver unit is unchanged, or may treat the position as unknown or indeterminate.

In some embodiments, a function of the reliability measures for each decoded bit, or each bit-reliability measure taken individually, must have to exceed an inertia threshold value before the decoded identifier value is used to determine a position update for the mobile unit when it differs from a preceding decoded value. This inertia threshold may be such as to present a greater hurdle than the aforesaid reliability threshold value. In this way, a higher level of confidence is required before a change in the position of the mobile receiver unit is determined. Such an approach can provide helpful stability to the system by preventing spurious changes in the estimated position of the mobile receiver unit in cases where its position cannot be determined reliably. It can also help reduce power consumption in the mobile receiver unit, as is explained in more detail below.

Let received signal strength for a bit position n ($RSS_n$) be defined as the larger of the sum of the amplitude value for the first frequency and first time position and the amplitude value for the second frequency and second time position, $A_n(f1,t1)+A_n(f2,t2)$, and the sum of the amplitude value for the second frequency and first time position and the amplitude value for the first frequency and second time position, $A_n(f2,t1)+A_n(f1,t2)$.

Then, in some embodiments, a decoded binary identifier is not used to update the position of the mobile receiver unit when the minimum bit-position received signal strength across all the bits of the identifier is less than a predetermined fraction of the average bit-position received signal strength across all the bits of the identifier. This ensures that every bit is accurately received.

In some embodiments, a decoded binary identifier is not used to update the position of the mobile receiver unit when the sum of the bit-position received signal strengths across all the bits of the identifier is less than a predetermined minimum limit.

In some embodiments, rather than transmitting the encodings of each bit position at the same time as each other, two transmitter stations may be configured to transmit signal portions encoding at least one bit position value at the same time as each other, and to transmit signal portions encoding at least one other bit position value at different times from each other. This may be advantageous where two transmitter stations share certain physical components in common, such as a digital-to-analogue converter: they may transmit simultaneously those bit position for which their respective identifiers have the same value, and at different times those bit positions for which their respective identifiers have different values.

In this way, the two transmitter stations can avoid the need between them to transmit more than one frequency simultaneously, which can allow the pair to be of simpler design. Such a pair of transmitter stations may be located close to each other.

They may share a common housing. The two transmitters may, however, have separate respective ultrasonic transducers.

The decoding means may be located in the receiver unit or may be remote therefrom, or may be split between the receiver unit and another location. If it is remote from the receiver unit, the receiver unit may be configured to transmit information relating to the received signal to the decoding means; e.g. by radio. In a preferred set of embodiments, however, the decoding means is located in the receiver unit. The decoding means, or decoder, may take any suitable form. It may comprise one or more CPUs and/or one or more DSPs and/or dedicated logic. It may comprise analogue circuitry. It may execute software comprising instructions that cause it to carry out the behaviour described herein. Such software, and a tangible or intangible medium bearing the same, forms a further aspect of the invention.

The processing means, or processor, configured to use the decoded binary identifier to determine information relating to the position of the mobile receiver unit may be located within the receiver unit itself, but is preferably located in one or more remote servers. The processing means may comprise one or more CPUs and/or one or more DSPs and/or dedicated logic. It may comprise analogue circuitry. It may execute software comprising instructions that cause it to carry out the behaviour described herein. Such software, and a tangible or intangible medium bearing the same, forms a further aspect of the invention. The information relating to the position of the mobile receiver unit may comprise an estimate of a two-dimensional area (e.g. on a floor plan of a building) or a three-dimensional volume in which the receiver unit is located. It may comprise a set of coordinates for the receiver unit. The system may comprise output means, such as a graphical display device, for outputting the position information to a human. It may output the position information to another component or another system, such as an alarm system that triggers an alarm if a receiver unit enters or leaves a predefined space. It may simply store the position information in a memory for later use.

The mobile receiver unit may comprise a radio transmitter. It may be configured to transmit the decoded binary identifier by radio. This may be received by a radio receiver, such as an 802.11 access point or an 802.15.4 receiver. The radio receiver may be communicably connected to the position-determining processing means, e.g. by an Ethernet connection.

Preferably the mobile receiver unit is configured to determine when the decoded binary identifier differs from a previously decoded identifier and to transmit the identifier to an external receiver (e.g. by radio, ultrasound, or any other means) when it determines such a difference, so long as a reliability criterion for the decoding is satisfied. Some such reliability measures have already been described. In this way, frequent radio transmissions are avoided when ultrasound interference is high, or when the mobile device is located mid-way between two or more transmitter stations transmitting different identifiers. The mobile receiver unit preferably also only transmits the identifier with reduced frequency or not at all when there is no change in its value from one transmission interval to the next.

The binary identifier transmitted by a transmitter station may be a zone identifier. The transmitter stations may also transmit area identifiers, e.g. within the same signal, optionally using the same encoding protocol as the zone identifier. The area identifier may be same length as the zone identifier (e.g. 5 bits), which can simplify implementation. In an implementation, a building or site may be divided into multiple areas, each of which is divided into multiple zones. The decoding means may be configured to decode the zone identifier first and to determine whether the zone identifier has changed from a preceding decoded zone identifier (e.g. from the previous transmission). It may be configured to decode the area identifier only if the zone identifier has changed. This can save power.

As previously stated, preferred embodiments of the invention comprise a static transmitter station and a mobile receiver unit.

Thus from a further aspect, the invention provides a system for determining the position of a mobile receiver unit using an ultrasonic signal, the system comprising: a static transmitter station arranged to transmit an ultrasonic signal that encodes a binary identifier, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal; a mobile receiver unit arranged to receive the ultrasonic signal; decoding means configured to decode the binary identifier from the received signal by determining a value for each bit position in the identifier using information relating to the strength of the received signal at (a) the first frequency and first time position in the received signal that are associated with the bit position, (b) the associated first frequency and second time position, (c) the associated second frequency and first time position, and (d) the associated second frequency and second time position; and processing means configured to use the decoded binary identifier to determine information relating to the position of the mobile receiver unit.

From another aspect, the invention provides a method of determining the position of a mobile receiver unit using an ultrasonic signal, the method comprising: transmitting an ultrasonic signal that encodes a binary identifier from a static transmitter station, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal; receiving the ultrasonic signal at a mobile receiver unit; and decoding the binary identifier from the received signal by determining a value for each bit position in the identifier using information relating to the strength of the received signal at (a) the first frequency and first time position in the received signal that are associated with the bit position, (b) the associated first frequency and second time position, (c) the associated second frequency and first time position, and (d) the associated second frequency and second time position; and using the decoded binary identifier to determine information relating to the position of the mobile receiver unit.

However, it will be appreciated that many of the principles can be applied to systems in which a transmitter unit may be mobile and a receiver station may be static.

Therefore, in some embodiments of the earlier aspects, the transmitter device is a mobile transmitter unit. The receiver device may then be a static receiver station. The processing means may identify a transmitter unit that is within audible range of the static receiver station and thereby determine an estimate of this transmitter unit's location from a knowledge of the location of the static receiver station.

The system may comprise a plurality of such mobile transmitter units. It may comprise a plurality of such static receiver units. While the mobile transmitter units may transmit their signals substantially simultaneously, as has already been described above with reference to static transmitter stations, it may be advantageous in the present embodiments for the mobile transmitter units instead to transmit their signals at different times. This may be accomplished by allocating different time slots to the respective mobile transmitter units. The processing means may then be able to use a received signal strength for each mobile transmitter unit at one or more static receiver stations and/or use time-of-arrival information to determine information relating to the positions of each of the mobile transmitter units. This might not be possible if the mobile transmitter units were to transmit simultaneously, with only the binary identifier of the unit closest to a particular receiver station being decoded.

Ultrasonic signals are acoustic signals having a frequency higher than the normal human hearing range; typically this means signals having a frequency greater than 20 kHz, e.g. between 30 and 100 kHz.

It will be appreciated that any feature described herein with reference to one embodiment or aspect of the invention may equally be used with any other embodiment or aspect, wherever appropriate.

BRIEF DESCRIPTION OF THE DRAWINGS

Certain preferred embodiments of the invention will now be described, by way of example only, with reference to the accompanying drawings, in which:

FIG. 1 is a perspective diagram of a positioning system embodying the invention;

FIG. 2 is a figurative drawing of a static transmitter station and a mobile receiver unit;

FIG. 3 is a table showing the structure of a signal transmitted by the transmitter station.

DETAILED DESCRIPTION OF THE INVENTION

Figure 4:
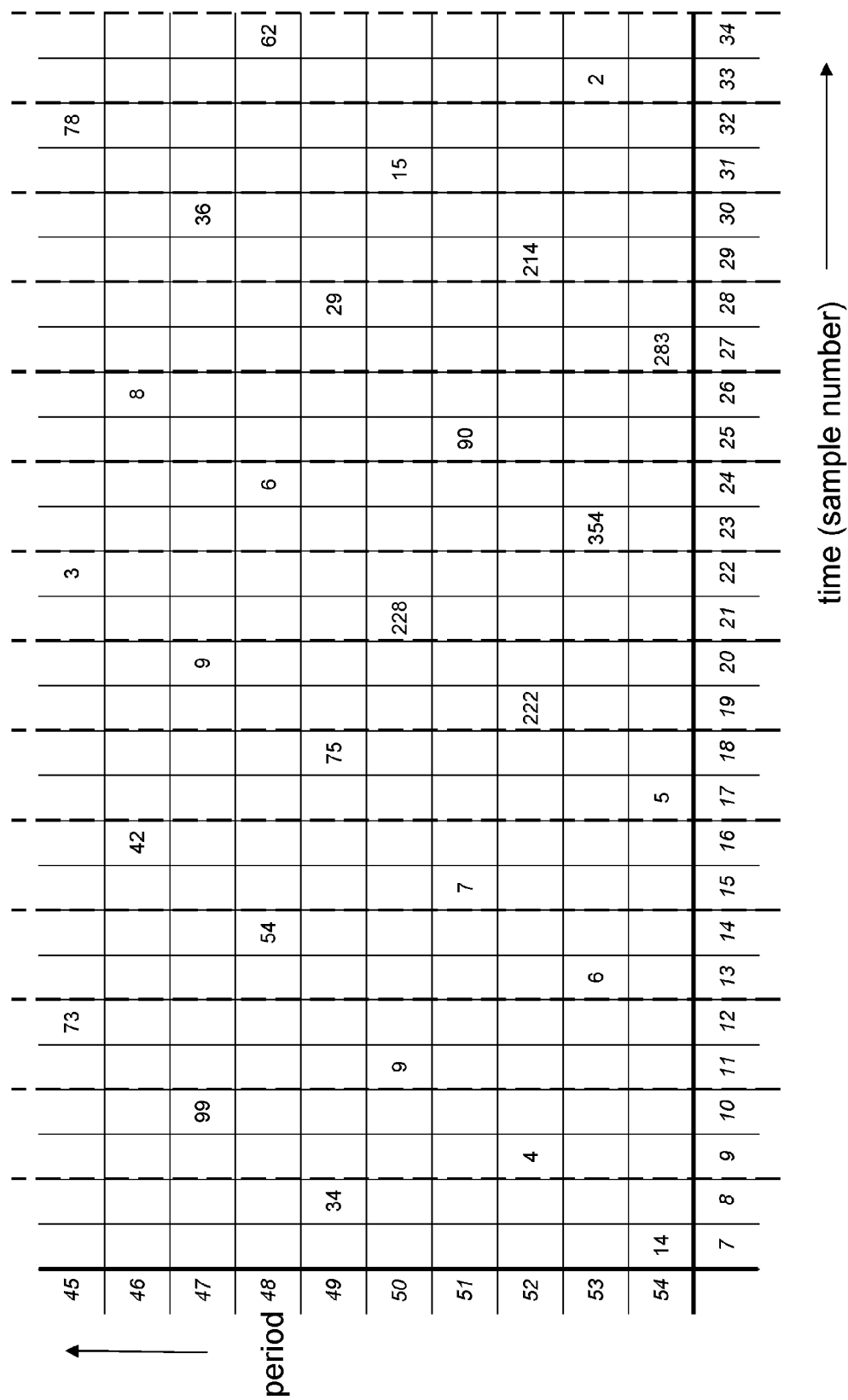
FIG. 4 is a plot of ultrasound samples received by the receiver unit, showing amplitudes at different wavelengths and times.

FIG. 1 shows a room 2. A first static transmitter station 4 and a second static transmitter station 6 are fixed to adjacent walls of the room 2. A person 8 in the room is carrying a mobile receiver unit 10. A network cable 12 connects the two transmitter stations 4, 6 to a remote server 14. There may be other, similar transmitter stations (not shown) at other positions in the room 2 and in other rooms in the building, all connected to the remote server 14 by network cable.

In other embodiments, a network cable may not be necessary and some or all of the transmitter stations may communicate with a remote server by wireless means, such as radio.

FIG. 2 shows the first transmitter station 4, which has an ultrasonic sounder 20 and processing logic 22 for causing the ultrasound sounder 20 to transmit ultrasonic signals. It may receive power over the network cable 12 (e.g. power over Ethernet) or from an internal battery (not shown). The second transmitter station 6 has a similar configuration. FIG. 2 also shows the mobile receiver unit 10, which has a microphone 24 and associated circuitry capable of receiving ultrasonic signals from the transmitter station 4, and processing logic 26 for sampling and processing received signals. It contains a battery (not shown).

In use, the server 14 causes each transmitter station 4, 6 to transmit simultaneous ultrasonic signals that encode respective identifiers. In this example, the two transmitter stations 4, 6 have different identifiers, although this need not always be the case. The server 14 may optionally also instruct one or both transmitter stations 4, 6 to encode further information in the signal, such as an instruction for the mobile receiver unit 10 to inform the server 14 of the mobile unit's location or the remaining charge in its battery (e.g. using a separate radio transmitter on the mobile unit).

The encoding of the binary identifier and such optional further information is carried out using a scheme based on the transmission of particular ultrasound frequencies (tones) at particular times, as described in more detail below.

The mobile receiver unit 10 receives the synchronised signals from both transmitter stations 4, 6, since both are within audible range if the receiver unit 10. There may be other transmitter stations in other rooms (not shown) whose signals are too attenuated for the receiver unit 10 to receive. The encoding is such that it allows the mobile receiver unit 10 to determine the identifier encoded in the strongest transmitter station signal, which is typically the closest transmitter station to the receiver unit 10. The receiver unit 10 communicates this identifier to the server 14, for example, by using a radio transmitter (not shown) on the receiver unit 10, or by ultrasound transmission. The server 14 can thereby monitor the location of the receiver unit 10. Depending on the layout of the transmitter stations in the system, it can typically estimate what room the mobile unit is in and potentially what part of the room the mobile unit 10 is in; for example, a first half of the room or a second half of the room.

Each ultrasonic signal may also comprise a signal portion intended for accurate time-of-flight determination of the distance between the transmitter stations 4,6 and the receiver unit 10; such time-of-flight information may be used for optional multilateration positioning to estimate more precisely the location of the mobile receiver unit 10 within the room 2, using well known multilateration algorithms. These signal portions may use a different encoding from that used for the binary identifiers, such as a direct-sequence spread-spectrum signature which allows for robust time-of-arrival measuring in the presence of echoes and other interference.

The transmissions from the two transmitter stations 4, 6 are synchronised so as to start simultaneously. This synchronisation may be accomplished using network-synchronised clocks in each transmitter station 4, 6, along with a predetermined transmission schedule.

FIG. 3 shows the general structure of an ultrasound signal transmission as transmitted by each of the transmitter stations 4, 6.

The signal starts with an initial trigger tone, to alert the receiver unit 10 to the signal. This comprises one of a pair of frequencies (tones), A, of 10 milliseconds duration. This is followed by a synchronisation tone, which the receiver unit 10 uses to synchronise its decoding of the signal. The synchronisation tone is one of a different pair of frequencies, B. The receiver unit 10 may receive synchronisation tones at slightly different times from different transmitter stations 4, 6, due to the different times-of-flight between it and the transmitter stations 4, 6; it synchronises to the first-received synchronisation tone having a minimum signal strength.

These tones are followed by an on-off-keyed continuation bit, which indicates whether or not the signal contains any optional data content, after the zone and area identifiers have been transmitted. This continuation bit is encoded on one of a pair of frequencies, C. If the continuation bit is positive, the receiver unit 10 will try to decode the continuation data content.

After 30 milliseconds, a five-bit zone identifier (ZID) is transmitted, followed immediately by a five-bit area identifier (AID). The first bit of the zone identifier determines which of a pair of frequencies, D, is transmitted at 30 milliseconds in to the signal, for a duration of 10 milliseconds. The other frequency of the pair D is later transmitted at 80 milliseconds in to the signal, again for 10 milliseconds. Each bit of both identifiers is thus effectively transmitted twice, at a first position in the signal and then again 50 milliseconds later, using different frequencies from the respective pair, as shown in the diagram.

Optional continuation data (CON), which may encode a command to the mobile receiver unit, for instance, starts 230 milliseconds in to the signal and is encoded in the same way as the identifiers, with each bit being frequency encoded at two different time positions in the signal, once as a positive bit and once as a negative, complementary bit (or equivalently, as the same bit but encoded with opposite frequencies at the two time positions).

FIG. 4 figuratively illustrates ultrasound samples taken by the mobile receiving unit 10.

The horizontal axis represents time, shown here as sample numbers. Two three-millisecond samples are taken sequentially every ten milliseconds, with a break of four milliseconds between each pair. I.e. sample 7 precedes sample 9 by ten milliseconds, with the dashed line between the end of sample window 8 and the start of sample window 9 representing a gap of four milliseconds in which no sample is taken.

The vertical axis represents the sampled ultrasound period, shown here as the number of 2 MHz clock cycles in one period. In other words the ultrasound frequency at which the sample is taken is 2 MHz divided by the axis label.

Each box represents one ultrasound sample at or around the frequency given by the vertical axis. The signal amplitude over the 3 millisecond sample window is shown within the box. This may be measured in any appropriate manner (e.g. peak-to-peak, RMS, etc.). At each sample window, the receiver unit 10 may be tuned to listen only for signals around the relevant frequency. The signal amplitude may be determined using analogue circuitry or digitally (e.g. by Fourier transform).

In other embodiments, two frequencies may be sampled simultaneously within the ten-millisecond window. They may be sampled simultaneously for three milliseconds or longer.

The first ten samples (numbers 7 to 16) in FIG. 4 relate to the "positive" tones of the zone ID. The next ten samples (numbers 17 to 26) relate to the "negative", or complementary encoded, tones of the zone ID.

The second-transmitted bit of the zone ID (ZID2) shows an amplitude of 99 at sample 10 (at a frequency of 2/47 MHz) and 222 at sample 19 (at a frequency of 2/52 MHz). This contrasts with an amplitude of 4 at sample 9 (2/52 MHz) and of 9 at sample 20 (2/47 MHz). It can be reasonably inferred from these values that the closer of the transmitter stations 4, 6 to the receiver unit 10 transmitted its ZID2 bit on 2/45 MHz at 40 milliseconds in to the signal and on 2/52 MHz at 90 milliseconds in to the signal. This allows the value of ZID2 bit to be decoded, using the predetermined mapping between the bit value and the choice of frequencies from the pair, E.

It will be seen that some of the samples have more interference, potentially from the more distant of the transmitter stations 4, 6, or due to destructive interference or noise from other sources. Because both transmitter stations 4, 6 are synchronised and using the same encoding mechanism, they will be transmitting different frequencies from the same pair at positions where their binary identifiers differ in value.

How the identifiers can be decoded automatically is explained in more detail below.

The amplitude measured for index k(0,1) in each bit index n (mod 5) by the receiver unit 10 is: $A_n^k$.

A difference ratio can be calculated:

$$R_n^k = \frac{A_n^k - A_{n+5}^k}{A_n^k + A_{n+5}^k}$$

In situations where there is no interference, it can be expected that $R_n^0 = -R_n^1$. However this will not always be the case in the real world.

When $|R_n^k| > 0.5$, the mobile receiver unit 10 can determine that it can reliably decode a zone identifier zone (i.e. that it is a predefined region containing a transmitter station). When it is less than 0.5, the position of the mobile receiver unit 10 cannot reliably be determined.

The difference between the two frequency ratios can be used to obtain a measure of reliability by calculating an error signal (as an arithmetic mean):

$$\partial R_n = \left| \frac{R_n^0 + R_n^1}{2} \right|.$$

An amplitude for each bit value can be calculated:

$E_n^0 = A_n^0 + A_{n+5}^1$; and $E_n^1 = A_n^1 + A_{n+5}^0$.

A received signal strength (RSS) value for each bit can be calculated, by summing energy in "winning" bit values:

$$RSS_n = Max(A_n^0 + A_{n+5}^1, A_n^1 + A_{n+5}^0) = Max(E_n^0, E_n^1).$$

The ratio for the frequency pairs can be combined into a single ratio signal.

In some embodiments, this may be done by averaging the two ratios (arithmetic mean):

$$R_n^{arith} = \frac{R_n^0 - R_n^1}{2}.$$

In other embodiments, the two ratios are averaged using the sum of $RSS(A_n^k + A_{n+5}^k)$ values as a weight (weighted mean). This can be written as:

$$R_n^{weighted} = \frac{E_n^1 - E_n^0}{E_n^1 + E_n^0}.$$

The value of a bit in the received signal is decoded based on whether this single ratio signal is positive or negative (when the received signal is deemed sufficiently reliable for accurate decoding).

Incorrect messages can occur when random noise that triggers the receiver unit 10 to start a decoding at the wrong time, or when there is poor signal to noise ratio.

The following algorithms are used to halt decoding of the zone ID and/or area ID in such situations.

A "ratio difference sum" algorithm filters messages by calculating the sum of the ratio error values and imposing a maximum value on it (e.g. one resulting in an average error of 0.2 per frequency ratio). For instance, the receiver unit 10 may be configured to halt the decoding if:

$$\Sigma_n \partial R_n < 1.5$$

The principle used here is that the messages should result in two ratio sets that have opposite polarity: $R_n^0 = -R_n^1$. A large discrepancy between the ratios indicates that the received message might not have the correct format (e.g. the receiver unit 10 might be trying to decode noise from a different source), especially if such discrepancy occurs repeatedly.

Another check can be provided by a "minimum to average factor" algorithm. The $RSS_n$ should be fairly consistent for each n so as to rule out random ultrasound noise (i.e. with high signal strength). The algorithm passes a signal with a reasonably consistent bit signal strength throughout the binary identifier. The receiver unit 10 therefore imposes a maximum limit on the factor between the minimum value observed and the mean value:

$$Min(RSS_n) > a \cdot Mean(RSS_n),$$

where a has a suitable value such as around 0.1 to 0.2. If this condition is not met, decoding is halted.

A further check can be provided by an "RSS limit" algorithm. A minimum limit for the total RSS value is imposed; i.e.

$$\Sigma_n RSS_n > RSS_{min}$$

for a suitable value of $RSS_{min}$. If this condition is not met, decoding is halted.

A still further check can be provided by a "weakest bit" algorithm, which requires $min(RSS_n)$ to be above a threshold value, so as to ensure that it is above the noise floor in the receiver unit 10. When at the noise floor, the ratios can become random and occasionally random ratios may otherwise register as a successful decoding. This algorithm therefore requires that $$Min(RSS_n) \geq A^* \{\text{the sum of the energy in the losing bit values}\},$$

where the energy in a "losing bit value" is $Min(E_n^0, E_n^1)$ for each bit n, and for a suitable value of A, such as 0.5.

In some embodiments, both the ratio signal, $R^{arith}$ or $R^{weighted}$, and its error, $\partial R_n$, are run through a low-pass filter such as a bit-wise running average filter (e.g. alpha-beta filter). The selection of alpha represents a trade-off between latency and accuracy. When the mobile receiver unit 10 is under near line-of-sight conditions, the RSS levels are high and little averaging is required to select the correct zone (e.g. alpha equals 0.75 to 1). On the opposite end of the RSS spectrum, very diffuse sound can result in random zone-change detections. In this case, low values of alpha are applied (e.g. 0.125 to 1.25) to make sure that zone selection is correct. Under these conditions ambiguity of one or more of the bit values can result in incorrect decoding of the zone identifier.

For the error signal, a value of around 0.125 has been found to give a fairly constant error estimate in a static receiver unit position. The error signal is taken as the absolute sum of the ratio difference (pos-neg).

The above described running average method has been found to be effective in reliably decoding the identifier of the closest transmitter station 4, 6.

The zone ID and area ID are decoded based on ratio polarity. After filtering of the ratio signal, $R^{arith}$ or $R^{weighted}$, and its error, $\partial R_n$, a new zone ID is determined whenever all the five ratio signals in the zone ID are found to exceed their respective error signals and a minimum threshold (typically around 0.1), whichever is larger; i.e.

$$R_n > Max(\partial R_n, 0.1).$$

A valid decoding may also be subject to some or all of the checks described above.

When not all the ratios pass the threshold limits, the zone ID currently being decoded is checked (assigning bits on ratio polarity) against the last successfully decoded zone ID. If the values are equal then the zone ID is confirmed as still being valid (a refresh).

The area ID is decoded only after a change in zone ID is determined. No refresh is allowed on an are ID (i.e. all bit ratios need to be larger than error limits).

The continuation data content frame is optionally sent and flagged by a continuation bit. If the continuation bit is received, the continuation frame is decoded by the receiver unit 10.

The transmitter stations 4, 6 may repeat the transmission of their identifiers at regular intervals, such as every second.

Optionally if a predetermined time-out period elapses (e.g. of 3.5 seconds) without any refresh or update in zone ID, the mobile receiver unit 10 can be considered outside the coverage of the positioning system, until it is next validly detected.

The above calculations may be carried out on the mobile receiver unit 10, or on the remote server 14, or may be split between the two in any appropriate proportions. The receiver unit 10 may transmit a decoded zone and/or area identifier to the remote server 14, e.g. by radio.

The remote server 14 may use the known positions of the transmitter stations 4, 6 to estimate the position of the mobile receiver unit 10 by assuming that the decoded identifier corresponds to the identifier of the transmitter station 4, 6 closest to the receiver unit 10. This process may make use of knowledge of the building, such as the location of the walls, doors, etc. of the room 2.

Finer-resolution positioning (e.g. within a room or zone) may optionally be made using different ultrasound signals transmitted by the transmitter stations 4, 6, which may be better suited to time-of-flight multilateration processing.

The server 14 may cause the position of the mobile receiver unit 2 to be displayed on a screen, or output in some other way, to a human user. The position of the mobile receiver unit 2 may be integrated in the workflow of the overall operation of a facility, such as a hospital, providing position- and context-aware services for both human users and automated tasks.

It will be appreciated that the system will typically have many transmitter stations situated throughout an area such as a building, and many mobile receiver units.

Although this invention has been shown and described with respect to the detailed embodiments thereof, it will be understood by those skilled in the art that various changes in form and detail thereof may be made without departing from the spirit and the scope of the invention.

What is claimed is:

1. A system comprising:
   a transmitter device configured to transmit an ultrasonic signal that communicates a binary identifier using an encoding, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal; and
   a receiver device comprising an ultrasonic receiver and a processing system, wherein the receiver device is configured to:
   receive, with the ultrasonic receiver, said ultrasonic signal that encodes the binary identifier, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal;
   use the processing system to determine, for each bit position in the identifier, information relating to the strength of the received signal at (a) the first frequency and first time position, associated with the respective bit position, (b) the first frequency and second time position, associated with the respective bit position, (c) the second frequency and first time position, associated with the respective bit position, and (d) the second frequency and second time position, associated with the respective bit position; and
   use the processing system to decode the binary identifier from the received signal by determining a respective value for each bit position in the identifier from said information relating to the strength of the received signal.

2. The system of claim 1, wherein the transmitter device is a static transmitter station, and wherein the receiver device is a mobile receiver unit.

3. The system of claim 1, further comprising a position-determining subsystem, wherein the position-determining subsystem is configured to use receipt of the binary identifier by the receiver device to detect proximity between the transmitter device and the receiver device, and thereby to estimate a position of the transmitter device or of the receiver device.

4. The system of claim 1, wherein the processing system is configured to determine a reliability measure for each bit of the binary identifier in the received signal, and wherein the system further comprises a position-determining subsystem configured to use the decoded binary identifier to determine information relating to the position of the transmitter device or of the receiver device, and to use the reliability measures for all the bits in the identifier when using the decoded binary identifier to determine information relating to the position of the transmitter device or of the receiver device.

5. The system of claim 4, configured to require a function of the reliability measures for the decoded bits to exceed an inertia threshold value, or to require each bit-reliability measure individually to exceed an inertia threshold value, before the decoded identifier is used to determine a position update for the transmitter device or for the receiver device, when the decoded identifier differs from a preceding decoded identifier.

6. The system of claim 1, configured not to use a decoded binary identifier to update the position of the transmitter device or of the receiver device when the minimum bit-position received-signal-strength across all the bits of the identifier is less than a predetermined fraction of the average bit-position received-signal-strength across all the bits of the identifier, where the received-signal-strength for a bit position is determined as the larger of (i) the sum of an amplitude value for the first frequency and first time position and an amplitude value for the second frequency and second time position, and (ii) the sum of an amplitude value for the second frequency and first time position and an amplitude value for the first frequency and second time position.

7. The system of claim 1, comprising a plurality of static transmitter stations, wherein the static transmitter stations are configured to transmit ultrasonic signals substantially simultaneously, and wherein the ultrasonic signals communicate respective binary identifiers according to the aforesaid encoding.

8. The system of claim 7, wherein the static transmitter stations are configured to transmit their respective ultrasonic signals with the same transmission power as each other.

9. The system of claim 7, wherein the static transmitter stations are synchronised and wherein the static transmitter stations are configured, for each bit position of their binary identifiers, to transmit at substantially the same time as each other a portion of their respective ultrasonic signals that encodes that bit position of their binary identifiers.

10. The system of claim 7, comprising two static transmitter stations configured to transmit, at the same time as each other, signal portions encoding at least one bit position of their binary identifiers at which their respective identifiers have the same value as each other, and to transmit, at different times from each other, signal portions encoding at least one other bit position for which their respective identifiers have different values.

11. The system of claim 10, wherein said two static transmitter stations share a common housing, but have separate respective ultrasonic transducers.

12. The system of claim 7, wherein the static transmitter stations are configured to transmit zone identifiers and area identifiers within the same ultrasonic signal, and wherein the system further comprises a position-determining subsystem configured to decode a zone identifier from a received signal first and to determine whether the zone identifier has changed from a preceding decoded zone identifier, and to decode the area identifier from the received signal only if the zone identifier has changed.

13. The system of claim 1, further comprising a position-determining subsystem, located in one or more remote servers and configured to use the decoded binary identifier to determine information relating to the position of the transmitter device or of the receiver device.

14. The system of claim 1, wherein the receiver device is configured:
   to determine whether the decoded binary identifier differs from a previously decoded binary identifier;
   to determine whether a reliability criterion for the decoding is satisfied; and
   when both determinations are made, to transmit the decoded binary identifier to an external receiver.

15. The system of claim 1, wherein the transmitter device is a mobile transmitter unit, and the receiver device is a static receiver station.

16. The system of claim 15, comprising a plurality of mobile transmitter units configured to transmit signals at different times from one another, wherein the system further comprises a position-determining subsystem configured to use (i) a received signal strength for each mobile transmitter unit at one or more static receiver stations, or (ii) time-of-arrival information, or both, to determine information relating to the positions of each of the mobile transmitter units.

17. The system of claim 1, wherein the ultrasonic signal additionally comprises encoded data content, and a continuation bit to indicate the presence of said data content, and wherein the decoding subsystem is further configured to (i) detect the presence of the continuation bit in the ultrasonic signal, and (ii) in response to said detection, decode the data content from the ultrasonic signal.

18. The system of claim 1, further comprising a position-determining subsystem configured to use the decoded binary identifier to determine information relating to a position of the transmitter device or of the receiver device.

19. The system of claim 1, wherein the transmitter device comprises an encoder and an ultrasonic transducer, the encoder being configured to receive a binary identifier comprising a plurality of binary values at a plurality of respective bit positions, and to encode the binary identifier for transmission in said ultrasonic signal.

20. The system of claim 1, wherein the transmitter device comprises an encoder and an ultrasonic transducer, the encoder being configured to control the ultrasonic transducer to transmit, for each bit position in the binary identifier, the respective determined frequency at the first respective time position, and the respective other frequency at the second respective time position.

21. A receiver device comprising an ultrasonic receiver and a processing system, the receiver device being configured to:
   receive, with the ultrasonic receiver, an ultrasonic signal that communicates a binary identifier using an encoding, wherein the encoding is such that each bit position in the identifier is associated with a respective pair of frequencies and with respective first and second time positions in the signal, with the value of the bit position in the identifier determining which frequency of the pair of frequencies is transmitted at the first respective time position in the signal, and with the other frequency of the pair of frequencies being transmitted at the second respective time position in the signal;
   use the processing system to determine, for each bit position in the identifier, information relating to the strength of the received signal at (a) the first frequency and first time position, associated with the respective bit position, (b) the first frequency and second time position, associated with the respective bit position, (c) the second frequency and first time position, associated with the respective bit position, and (d) the second frequency and second time position, associated with the respective bit position; and
   use the processing system to decode the binary identifier from the received signal by determining a respective value for each bit position in the identifier from said information relating to the strength of the received signal.

22. The receiver device of claim 21, wherein the ultrasonic signal comprises a synchronisation preamble, and wherein the receiver device is configured to identify a first-received synchronised preamble that exceeds a threshold signal level after a predetermined start time, and to synchronise the decoding of the received signal using said first-received preamble.

23. The receiver device of claim 21, further configured to:
   calculate a difference ratio for the first frequency for a particular bit position, by calculating the difference between an amplitude value for the first frequency and first time position and an amplitude value for the first frequency and second time position, and by dividing said calculated first-frequency difference by the sum of said first-frequency amplitude values; calculate a difference ratio for the second frequency for said bit position, by calculating the difference between an amplitude value for the second frequency and first time position and an amplitude value for the second frequency and second time position, and by dividing said calculated second-frequency difference by the sum of said second-frequency amplitude values; and
   determine a binary value for said bit position in the decoded identifier according to whether or not said first-frequency difference ratio is greater than said second-frequency difference ratio.

24. The receiver device of claim 21, configured to determine a binary value for a bit position in the decoded identifier according to whether or not an amplitude value for the first frequency and first time position plus an amplitude value for the second frequency and second time position is greater than an amplitude value for the second frequency and first time position plus an amplitude value for the first frequency and second time position.

25. The receiver device of claim 21, configured to determine a binary value for a bit position in the decoded identifier according to the sign of a running average of a function of an amplitude value for the first frequency and first time position, an amplitude value for the first frequency and second time position, an amplitude value for the second frequency and first time position, and an amplitude value for the second frequency and second time position, determined across a plurality of received signals.

26. The receiver device of claim 21, configured to determine a reliability measure for each bit of the binary identifier in the received signal.

27. The receiver device of claim 21, configured:
to determine whether the decoded binary identifier differs from a previously decoded binary identifier;
to determine whether a reliability criterion for the decoding is satisfied; and
when both determinations are made, to transmit the decoded binary identifier to an external receiver.

28. The receiver device of claim 21, configured to (i) detect the presence of a continuation bit in the received signal, and (ii) in response to said detection, decode data content from the received signal.

* * * * *